United States Patent [19]

Kelly et al.

[11] Patent Number: 5,213,755

[45] Date of Patent: May 25, 1993

[54] LOW PRESSURE COOLANT INJECTION MODIFICATION FOR BOILING WATER REACTORS

[75] Inventors: David M. Kelly; Lawrence L. Chi, both of Freemont; Charles H. Stoll, Pleasanton; Gary L. Sozzi, Saratoga, all of Calif.

[73] Assignee: General Electric Company, San Jose, Calif.

[21] Appl. No.: 678,384

[22] Filed: Apr. 1, 1991

[51] Int. Cl.$^5$ ............................................. G21C 7/32
[52] U.S. Cl. .................................. 376/210; 376/282; 376/298; 376/370
[58] Field of Search ............... 376/210, 211, 282, 298, 376/299, 370

[56] References Cited

PUBLICATIONS

Lish; Nuclear Power Plant System and Equipment Chapter 3, p. 35, FIG. 3-18.

Primary Examiner—Donald P. Walsh
Assistant Examiner—Frederick H. Voss
Attorney, Agent, or Firm—Robert R. Schroeder

[57] ABSTRACT

A conventional low pressure coolant injection system for boiling water reactors is provided. With the modification, the cross tie conduits and associated valves remain open between two LPCI divisions. On the occasion of an LOCA, the LPCI pumps are activated and injection valves for each of the LPCI divisions are opened to commence coolant injection in the recirculation loops in simultaneous fashion. However, the rate of flow of water coolant within each injection system is controlled by a hydraulic resistance, which is selected to achieve reactor core cooling within requisite time and in requisite quantities from one injection path. Thus, even though coolant water may flow through a rupture within one recirculation loops, sufficient water will be injected in the other loop to achieve core cooling.

20 Claims, 3 Drawing Sheets

LOW PRESSURE COOLANT INJECTION MODIFICATION FOR BOILING WATER REACTORS

BACKGROUND OF THE INVENTION

Nuclear power plants traditionally have been designed for achieving long term, safe, and reliable performance. To assure safety, the plants incorporate systems and procedures representing a studied anticipation of emergency conditions. Design approaches will have considered theories or premises which may include, for example, design redundancies which are challenged by updated rules of performance as operating experience with nuclear power progresses. Thus, investigators in this power field continuously are called upon to develop improved analytic models of operation exhibiting improved boundings of operational factors and to further achieve higher levels of safety in view of changing rules of safety related performance. Because of the necessarily extensive time interval involved in developing or constructing a new nuclear power facility, for example such an effort may encompass ten years or more, and further in view of the numerous nuclear power facilities now in operation, these investigators typically are called upon to meet new rule criteria by modification of long-existing facilities. Retrofitting procedures can be quite expensive, calling for revised electrical power supplies, major valving replacements, and the like.

The nuclear industry has evolved a variety of reactor types. One such type finding substantial field use performs to produce steam for turbine drive within the reactor core itself and is referred to as a boiling water reactor (BWR). The reactor heated water of the BWR serves not only as working fluid, but also as a reaction moderator, and along with other parameters, its proper supply and application within the system necessarily has been the subject of safety requirements or rule generations by government regulatory agencies such as the Nuclear Regulatory Commission (NRC).

Typically, the general structure of a BWR nuclear system will include an upstanding reactor vessel which incorporates a lower reactor core structure beneath which are control rod drives. Above the core are, in order, a steam separator assembly and a steam dryer assembly leading to a steam outlet. About the reactor is a shield wall and outwardly of that a drywell. A pressure suppression chamber (wetwell), being torroidal in shape, is located below and encircling the drywell.

In more typical BWR installations, water coolant is heated in the reactor core to rise within the reactor vessel as a two-phase mixture of water and steam. This dual phase mixture then passes upwardly through the steam separator assembly and steam dryer structure to enter the steam line leading to a turbine. Following turbine drive, the steam is condensed to water and returned to the reactor by relatively large condensate and feedwater pumps of a feedwater system. The feedwater enters the downcomer region of the reactor, where it is mixed with the water returning from the steam separator and drying functions. The water in the downcomer region is circulated through the reactor core via the vertically oriented recirculation pumps which direct flow to the vertical jet pumps located between the core shroud and vessel wall (downcomer annulus). In typical fashion, two distinct recirculation loops with corresponding recirculation pumps are employed for this recirculation function.

In the event of some form of breakage or excursion generating malfunction, referred to as a "loss-of-coolant accident" (LOCA), designers anticipate that the relatively higher temperature-higher pressure water within the reactor will commence to be lost. A variety of safety systems and procedures may then be invoked both for containment and for thermal control of this LOCA. For the latter, thermal control, safety designs recognize that, while loss of the water moderator terminates the core reaction to eliminate a possibility of a nuclear incident, the momentum of generated heat or the residual energy within the reactor will remain of such magnitude as to require a cooling control to avoid, for example, core melt down. In general, the amount of water within the containment system is more than adequate for this purpose, for example that contained in the suppression pool, or additionally, the condensate storage tank. To apply this water coolant for the safety purpose, a variety of safety related techniques or "emergency core cooling systems" (ECCS) have been developed to accommodate the LOCA. For example, core spray (CS) systems and low pressure coolant injection (LPCI) installations have been evolved in a variety of configurations.

The LPCI system incorporates, for example, four pumps which are activated by a safety system in the event of a coolant loss. Where the loss of coolant is of sufficient extent, and the vessel pressure remains high, for example in the event of a small pipe break then, an automatic safety system will function to depressurize the reactor vessel permitting the relatively lower pressure water supply pumps to operate to introduce water to the reactor. Because the recirculation system as earlier described is ideally structured for this purpose, generally it is used by the LPCI system for water introduction under ECCS conditions.

Safety designs heretofore have recognized, however, that a recirculation loop may be broken under a LOCA condition. Thus, the pumping of water into that loop under such a LOCA condition may have no effectiveness. Accordingly, the LPCI systems have been equipped with a recirculation loop selection feature termed "loop selection logic" to avoid such conditions. This safety control detects the broken recirculation loop and initiates a procedure injecting water into the redundant, intact recirculation loop by actuating appropriate LPCI injection valves. Experience with such LPCI loop selection features have shown them to be complex and difficult to test and maintain. Under more current rule-based requirements, the design must accommodate for such occurrences as valve failure and the like. However, to function more effectively under current rules, procedures for retrofitting existing facilities to update them are elaborate and quite expensive, implementation involving such activities as recabling, pump reconnection activities and the like. Thus, an approach has been sought by investigators which offers operators the opportunity to eliminate the requirement for a loop selection logic regimen and associated costs therewith while still improving the reliability of the LPCI system.

SUMMARY

The present invention is addressed to an LPCI system and method which provides for injection loop modification achieving effective insertion of water coolant within the recirculating loops of conventional boiling water reactors, but without resorting to complex loop selection logic. The procedure recognizes that a break or rupture may have occurred in one of the recirculation loops and controls the rate and quantity of simultaneous coolant injection into each recirculation loop. Through analysis by modeling and the like of the requirements of the LPCI system in terms of time for complete coolant injection and in terms of the required quantity of injected fluid, flow rates of injection are derived and requisite quantities of coolant are determined and identified such that the LPCI process is controlled through the simple approach of utilizing flow rate controlling hydraulic resistances within coolant injection conduits. Those hydraulic resistances may be implemented with a conventional orifice, the size and shape of which determines desired flow rates or by the throttling of a valve within the injection conduit achieving the equivalent result. Under the process, cross tie conduits and associated cross tie valving otherwise used for recirculation loop selection for coolant injection are not activated, but merely remain in an open condition. Under the new method and system, necessary LCPI modifications are achieved without resort to the complicated system and instrumentation otherwise required for loop selection with a minimum of hardware perturbation, rewiring or repiping.

As another feature, the invention provides a low pressure coolant injection system for a nuclear power facility of a variety having a boiling water reactor, having a reactor core and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pumps in fluid flow communication with the suppression pool. First and second coolant injection conduits are provided which are coupled with respective discharge outputs of the first and second low pressure coolant injection pumps and to respective first and second recirculation loops. First and second hydraulic resistance components within respective first and second coolant injection conduits are provided for restricting the flow of water coolant therein to a predetermined fluid rate selected to deliver a predetermined quantity of water coolant to each of the first and second recirculation loops, the flow rates being selected as effective for carrying out the emergency cooling of the reactor core from one coolant injection conduit. A control arrangement is provided which is responsive to the safety output for actuating the first and second low pressure coolant injection pumps.

As another feature, the invention provides a method for injecting low pressure cooling water into the boiling water reactor of a nuclear power facility having a source of emergency core cooling water, first and second independent recirculation loops normally circulating water through the core of the reactor for steam generation and a safety system responsive to a loss-of-coolant accident to generate a safety output for effecting the supply of at least a predetermined quantity of water coolant to the reactor, comprising the steps of:

providing first and second water flow paths from the source of water coolant to respective first and second recirculation loops;

providing low pressure coolant injection pumps actuable for pumping water from the source through the first and second water flow paths;

providing a valve arrangement actuable from a closed to an open condition for effecting flow within the first and second water flow paths;

actuating the valve arrangement in response to the safety output to permit water coolant flow simultaneously in each first and second water flow path;

actuating the low pressure coolant injection pumps in response to the safety output; and restricting the flow of the water coolant in each first and second water flow path to a predetermined fluid flow rate selected to deliver the predetermined quantity of water coolant to each respective first and second independent recirculation loops, said flow rate being selected as effective for carrying out the emergency cooling of the reactor core from one water flow path.

As another feature, the invention provides a low pressure coolant injection system for a nuclear power facility of a variety having a boiling water reactor with a reactor core, and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pumps in fluid flow communication with the suppression pool and further includes a cross tie conduit arrangement for selectively interconnecting the discharge outputs of the first and second low pressure coolant injection pumps. First and second coolant injection conduits are provided which are coupled with respective discharge outputs of the first and second low pressure coolant injection pumps and to respective first and second recirculation loops. First and second low pressure coolant injection valves are provided within respective first and second coolant injection conduits and are actuable between closed and open orientations. Further provided are first and second hydraulic resistance devices within respective first and second coolant injection conduits for restricting the flow of water coolant therein to a predetermined fluid rate selected to deliver a predetermined quantity of water coolant to each of the first and second recirculation loops, the flow rate being selected as effective for carrying out the emergency cooling of the reactor core from one coolant injection conduit. A cross tie valve arrangement is provided within the cross tie conduit which is actuable between open and closed conditions for selectively directing the outputs of the first and second low pressure coolant injection pumps to one of the first and second recirculation loops through select first and second coolant injection conduits. A control arrangement is provided which is responsive to the safety output for actuating the first and second low pressure coolant injection pumps, the first and second low pressure coolant injection valves and retaining the cross tie valve arrangement in the open condition in the presence of the safety output.

Other objects of the invention will, in part, be obvious and will, in part, appear hereinafter.

The invention, accordingly, comprises the system and method possessing the construction, combination of elements, arrangement of parts and steps which are exemplified in the following description.

For a fuller understanding of the nature and objects of the invention, reference should be had to the following detailed description taken in conjunction with the accompanying drawings.

DETAILED DESCRIPTION OF THE INVENTION

Figure 1:
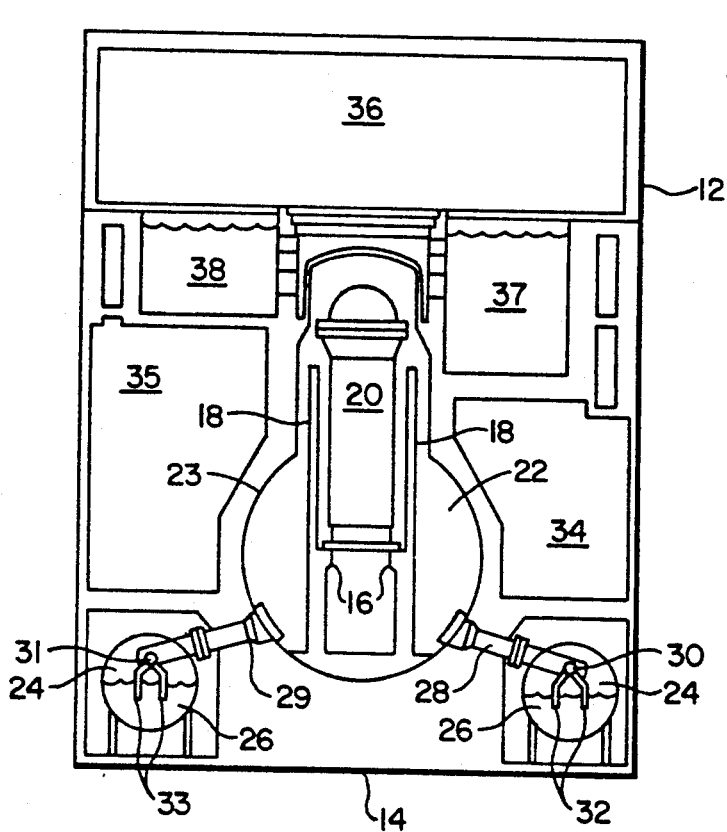
FIG. 1 is a schematic representation of one design for a reactor building.

Low pressure coolant injection systems (LPCI) necessarily perform with certain of the containment system based water retaining components of a nuclear power facility. Referring to FIG. 1, a containment or reactor building is represented generally at 10. Schematically represented within the figure is an outer wall 12 having a floor 14. Within the structure 10 is a reactor pedestal 16 which is a component of a biological shield wall 18 which surrounds a boiling water reactor (BWR) pressure vessel or reactor 20. A drywell is shown at 22 surmounted and defined by a steel structure or wall 23. A pressure suppression chamber or wetwell is represented at 24 which is torroidal in shape, surrounding the drywell 22. This suppression chamber 24 is approximately half filled with water to define a pressure suppression pool 26 and a vent system connects the drywell 22 to the wetwell 24 suppression pool 26. Drywell to wetwell vents as represented by main vents 28 and 29 extend from the drywell 22 to the suppression chamber 24 and are seen connected to respective vent headers 30 and 31 contained within the air space of the suppression chamber 24. Downcomer pipes are seen at 32 and 33 extending from respective headers 30 and 31 downwardly to terminate below the water surface of the suppression pool 26.

In the highly unlikely event of a high energy Nuclear Steam Supply System (NSSS) piping failure within the drywell 22, reactor water and/or steam would be released into the drywell 22 atmosphere to define a loss of coolant accident (LOCA). As a result of increasing drywell pressure, a mixture of drywell atmosphere, steam, and water would be forced through the vent system including main vents 28 and 29 into the pool of water 26 maintained within the suppression chamber 24. The steam vapor would condense into the suppression pool 26, thereby limiting internal containment pressure. The non-condensable drywell atmosphere would be transferred to the suppression chamber and contained therein.

The secondary containment or reactor building 10 further may include such features as reactor building rooms as at 34 and 35 as well as a refueling floor 36. Intermediate the rooms 34 and 35 are such components as spent fuel storage pools as shown at 37 and 38. Not shown, but remotely located would be a condensate storage tank (CST).

The suppression pool 26 provides, as noted above, a means to condense any steam released in the drywell area during a hypothetical LOCA; provides a heat sink for the reactor core isolation cooling system during hot stand-by operation until the decay heat can be piped directly to residual heat removal (RHR) heat exchangers; provides a heat sink for venting the nuclear system safety/relief valve; and provides a source of water for the emergency core cooling systems (ECCS). The suppression pool also serves as a heat sink under normal operating conditions. Blow-down through the main stream safety/relief valves during anticipated reactor transients is routed to the suppression pool or the steam discharges through a quencher at the end of the discharge piping and is condensed.

Figure 2:
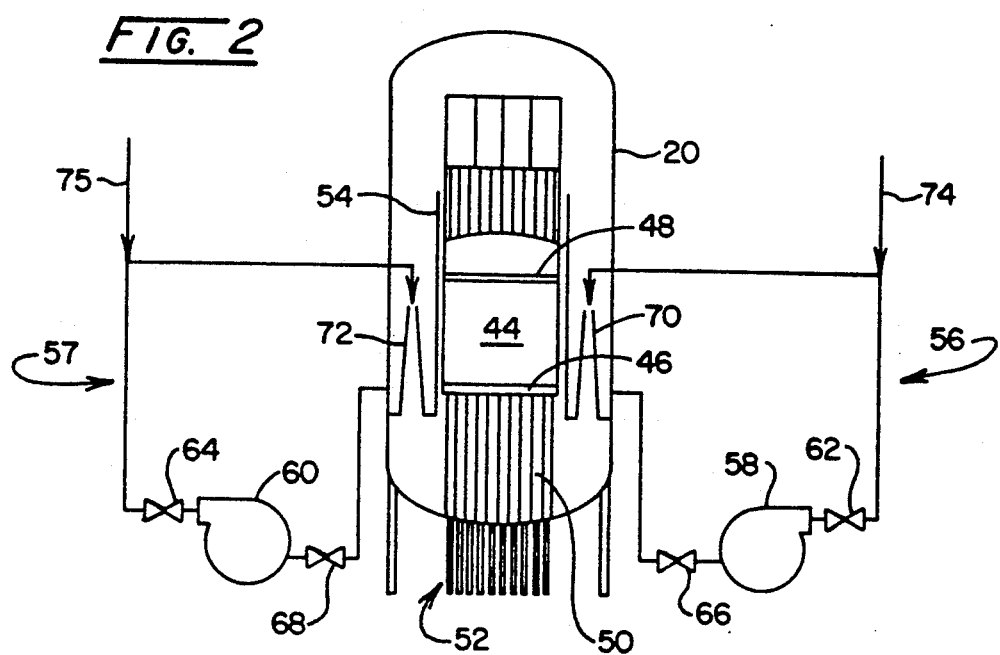
FIG. 2 is a schematic line drawing of a reactor vessel and two associated recirculation loops.

Referring to FIG. 2, a highly schematized representation of the recirculation components as they relate to reactor vessel 20 is provided. Vessel 20 is seen to include a reactor core 44 which is comprised of a matrix positioned array of fuel assemblies extending between a core plate 46 and a top guide 48. Core 44 is controlled by control rods which are located within an assemblage of control rod guides 50. The control rod drive hydraulic lines and motors are accessed through the bottom of the vessel 20 as represented generally at 52. Surmounting the core 44 and a portion of the control rod guide assemblage 50 is a cylindrical shroud 54 which functions to direct the circulation of water coolant within the vessel 20. In this regard, water is forced to flow downwardly along the annulus between shroud 54 and vessel 20 (downcomer region), whereupon it is directed upwardly through the core 44 in somewhat continuous fashion.

FIG. 2 additionally schematically portrays the reactor water recirculation system with which the LPCI modification of the invention performs. The function of this reactor water recirculation system is to circulate the required coolant and moderator through the reactor core. Consisting of two loops or divisions represented generally at 56 and 57, external to the reactor vessel, the system provides a pump for each loop within the interior of drywell 22 as represented, respectively, at 58 and 60. Each of the pumps 58 and 60 is structured in conjunction with a directly coupled water-cooled motor along with a variety of valves, here shown, for the purpose of simplicity, as recirculation discharge valves depicted, respectively, at 62 and 64, and respective suction or shut-off valves 66 and 68. In general, the redundant recirculation loops 54 and 56 provide for circulation flow through the core 44, taking suction from the downward flow in the annulus or downcomer region between the core shroud 54 and the wall of vessel 20. About one-third of the core flow is taken from the vessel 20 through the recirculation loops 56 and 57. Within these loops, it is pumped to a higher pressure, distributed through a manifold through which a number of pipes (not shown) are connected, and returned to the vessel 20, whereupon it is directed to a sequence of jet pumps, two of which are schematically depicted at 70 and 72. As the flow is directed to the initial stages of the jet pumps, momentum exchange induces the surrounding water in the downcomer region to be drawn into the jet pump throat where these two flows mix and flow is directed into the lower plenum of the reactor vessel 20. Flow then is redirected upwardly through core 44 for heat exchange. Feedwater is added to the system through spargers located above the downcomer annulus and joins the downward flow of water.

The low pressure coolant injection function (LPCI) is a part of the residual heat removal system (RHR) and, upon the occasion of an LOCA, functions to inject water to the reactor core through the loops 56 and 57, a coolant input approach which is selected because these loops inherently will place such emergency coolant at the right location within vessel 20. Under such a loss of coolant condition, the normal operating pressure, for example 1,000 psi within the reactor vessel 20 will be released, in part, because of the excursion at hand, and through a depressurization system. At this occurs, four LPCI pumps of the emergency core cooling system are activated. These pumps, while dedicated to the LPCI, additionally may be used for cooling water in the suppression pool 26, as well as other RHR system functions (e.g. containment spray cooling, suppression pool spray cooling and shut down cooling). However, upon the occasion of a signal calling for LPCI action, they are dedicated to the injection of water within loops 56 and 57, as represented by respective input arrows 74 and 75. Thus, coolant may be injected simultaneously at positions 74 and 75 from the suppression pool 26 and condensate storage tank (not shown) representing water sources already available with the facility 10. In the past, however, accommodation necessarily has been made to a rule or condition wherein it must be assumed that one loop 56 or 57 is ruptured. Thus, a selection type valve logic has been imposed to select that loop which remains viable for LPCI utilization. As noted above, this requirement has imposed the need for highly complex controls and water diversion schemes.

Figure 3:
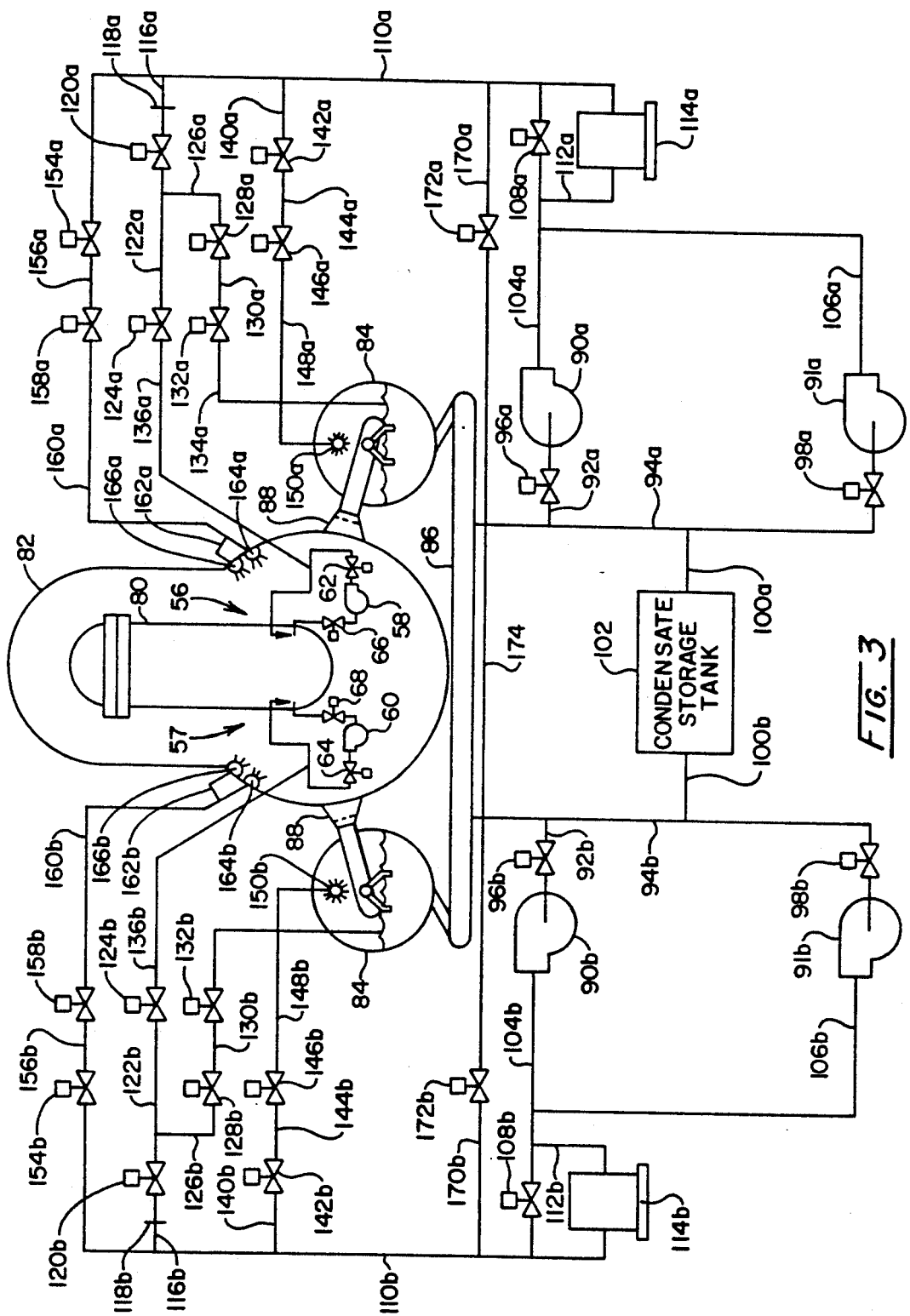
FIG. 3 is a schematic fluid flow diagram for a low pressure coolant injection system incorporating the features of the present invention.

Turning to FIG. 3, a schematic diagram is provided representing a split loop injection modification (SLIM) for the low pressure coolant injection (LPCI) system extant in certain current nuclear power installations. In the figure, a reactor vessel 80 is seen contained within a drywell defined by the wall or structure 82. Additionally shown within the drywell region are recirculation loops identified by the earlier numeration 56 and 57. These loops are seen to be present redundantly, as before, incorporating respective pumps 58 and 60, suction valves 66 and 68, and discharge valves 62 and 64. Below and encircling the drywell boundary 82 is a torroidal shaped suppression pool sectionally revealed in general at 84, and shown connected to an emergency core cooling system (ECCS) header 86 which is located within the shield building. Extending from the drywell wall 82 to the suppression pool 84 are downcomers 88 which direct liquids and/or steam released from a break thereinto.

Now looking to the low pressure coolant injection (LPCI) components, the suction inputs of two pumps 90a and 91a are seen connected to the ECCS header 86 and, the suppression pool 84 via lines 92a and 94a. A motor operated suction side valve is connected to the input of each as shown, respectively at 96a and 98a. Valves 96a and 98a are normally open. In addition to being directed to the ECCS header 86, it may be noted that line 94a also is coupled via line 100a to the condensate storage tank represented at block 102. Tank 102 generally will be mounted somewhat remotely within the power plant facility and, for the instant LPCI system, represents an alternate source of water. The outputs of pumps 90a, 91a, are directed via respective lines 104a and 106a through a heat exchanger by-pass valve 108a to line 110a during such occasion as valve 108a is open.

Flow from conduit 110a is directed to conduit 116a, whereupon its flow is controlled by an orifice 118a or equivalent hydraulic resistance, thence through an open LPCI valve 120a and to conduit 122a. With the opening of the valve 124a and the closure, inter alia, of valves 128a and 132a, the cooling flow is injected via conduit 136a to the recirculation loop 56 downstream of discharge valve 62. On such occasion, discharge valve 62 is closed. The position of injection from line 136a and closure of discharge valve 62 follows a postulation that rupture will occur on the recirculation line.

Under non-accident conditions where suppression pool cooling is required, valves 90a and 91a serve to supply a heat exchange loop function with the closure valve 108a and the by-passing of fluids from the suppression pool 84 and header 86 via conduit 112a to a heat exchanger 114a. Upon cooling, the liquid flows therefrom to conduit 110a. Under conditions requiring pool cooling, the fluid will flow through line or conduit 110a to conduit 116a, thence through an open LPCI injection valve 120a and to conduit 126a. For these normal conditions, a next serially disposed LPCI injection valve 124a will be closed to effect a diversion of the cooled fluid through conduit 126a, cooling valve 128a, line 130a, serially coupled cooling valve 132a, and line 134a into the suppression pool as at 84.

Conditions may be experienced where a high pressure condition exists above the water within the suppression pool as at 84. This high pressure condition will be steam induced and, accordingly, the pumps 90a and 91a may be employed to perform a quenching function. In this regard, it may be seen that conduit 140a extends from conduit 110a to a first suppression pool injection valve 142a, the output of which at line 144a is coupled to an next serially connected suppression pool spray injection valve 146a and thence via conduit 148a to a spray sparger 150a.

In the event that a high pressure condition occurs within the containment interiorly of wall 82, then a similar form of quenching or spraying may be employed. Such quenching will function, under accident conditions, to protect the pressure boundaries of the overall containment scheme. Accordingly, conduit 110a is seen to extend to a containment spray valve 154a, the output of which at line 156a is directed to a serially connected next containment spray valve 158a and thence via parallel lines 160a and 162a to paired spray spargers 164a and 166a.

The LPCI components thus far described in connection with recirculation loop 56 perform essentially symmetrically with respect to the corresponding components of recirculation loop 57. Such common components have been identified with the suffix "a" in the description presented immediately above for loop 56. Accordingly, the components common therewith for recirculation loop 57 are identified in the figure with the same numeration and a suffix, "b". In each case, the dual or redundant systems perform in conjunction with ECCS header 86, suppression pool 84, and condensate storage tank (CST) 102, and the description given above with respect to recirculation loop 56, applies to the corresponding components of recirculation loop 52. One additional feature of the LPCI system in the figure resides in a cross-tie line represented by conduit 170a, cross-tie valve 172a, conduit 174, cross-tie valve 172b, and line 170b. This cross-tie line has been used in earlier systems for various purposes including diverting the pumped flow from one side of the redundant system to the other. Without such control or, without the features of the instant system and method, water under pressure being injected under the system would follow the path of least resistance and exit from the ruptured recirculation loop while being ineffective in the intact loop. The complexities associated with earlier control systems are eliminated with the present invention. Under the arrangement of the instant invention, cross-tie valves 172a and 172b are left open continuously. Correspondingly, the size of orifice combination 118a and 118b are selected to limit or restrict the flow of water coolant to a fluid rate delivering a predetermined quantity of water coolant to each of the independent recirculation loops 56 and 57 simultaneously. This rate is effective for carrying out the emergency cooling of the core reactor 80 within time constraints required. The flow rate established through use of hydraulic resistance at each orifice 118a–118b is based upon a knowledge of first: (a) the quantity of fluid required to carry out necessary LPCI cooling of the core of reactor 80, and (b) the time available for carrying out emergency cooling. Under analysis, a sufficient quantity of this water will be present for this task because the coolant passing into the ruptured one of recirculation lines 56 or 57 is discharged to the drywell where the coolant evenutally flows into the main vent through the drywell downcomer back into the suppression pool. Thus, a correction technique is provided with elegant simplicity and which is readily available for the purpose of retrofitting existing BWR installations. Only a minimum amount of hardware perturbation is involved for retrofitting, rewiring procedures and the like as well as extensive repiping procedures not being required. In effect, the modified LPCI technique becomes one somewhat, passive in nature. The improved technique is referred to as a "split loop injection modification" (SLIM).

Figure 4:
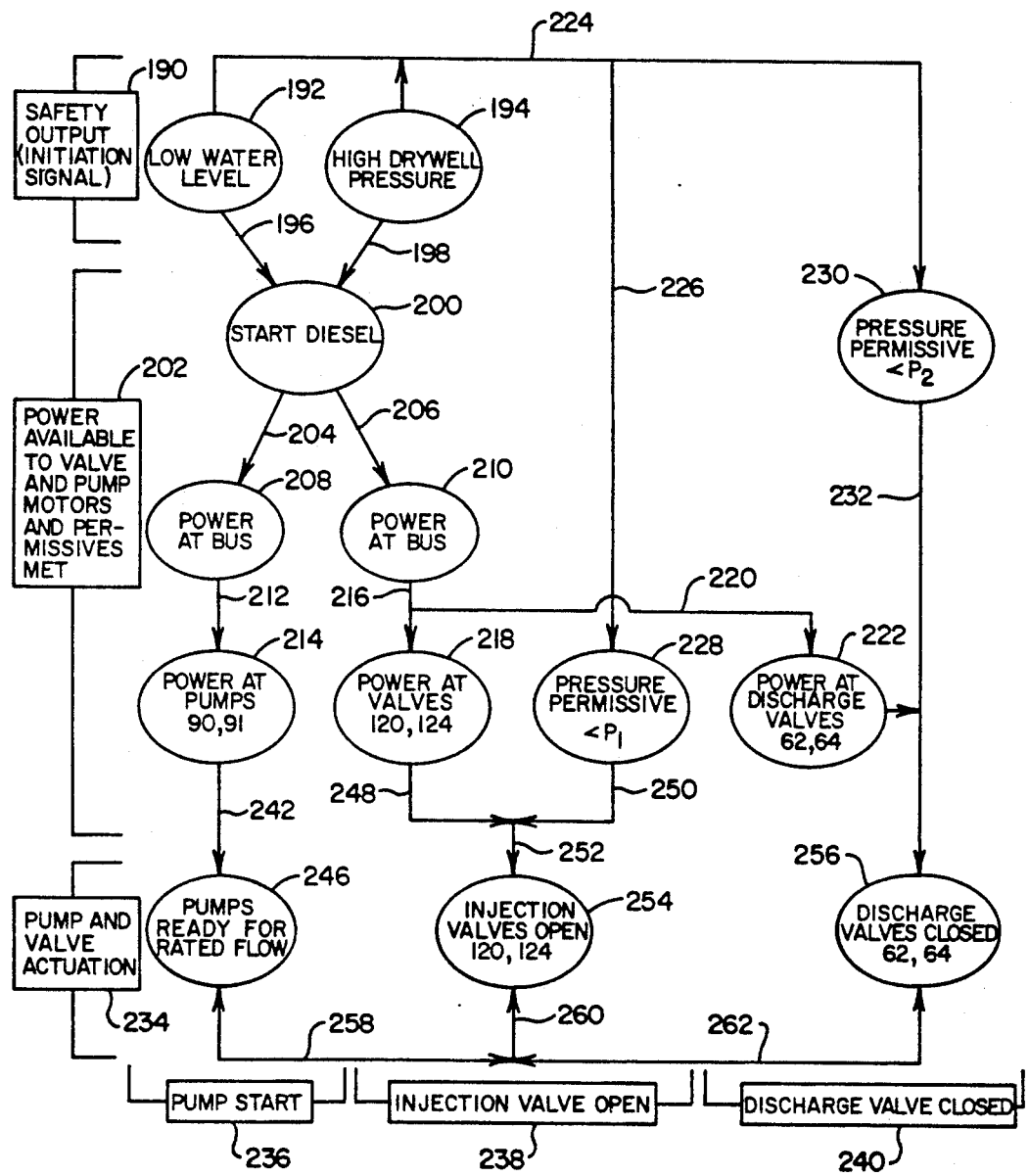
FIG. 4 is a logic diagram for control of a split loop injection modification of a low pressure coolant injection system for nuclear facilities.

Referring to FIG. 4, an LPCI SLIM logic diagram is presented. In the discussion below, common components of the system at hand previously identified with the suffix "a" or "b" are identified by the associated numeration only. In the figure, block and bracket 190 indicates sensing parameters wherein a safety output condition and corresponding initiation signal are generated. In this regard, as represented at logic diagram position 192, a low water level may be detected within reactor 80. This condition may obtain or, as represented at position 194, a high drywell pressure may be detected. These conditions represent the detection of a loss of coolant accident (LOCA). Upon their detection, then as represented by respective lines 196 and 198, the control logic proceeds to position 200 wherein a standby diesel engine is started to activate an electrical power source for the pump motors as well as those motors or electrical drive components functioning to control the valves employed in this system. This region of the logic diagram is shown identified at block and bracket 202 as making power available to valve and pump motors and for the purpose of meeting the criteria of "permissives", the latter conditions being conditions set upon the depressurization or development of requisite low pressures, P1 and P2, with respect to reactor 80.

Following the commencement of diesel engine derived power, then, as represented at lines 204 and 206, leading to respective positions 208 and 210, a decision or determination is made as to whether power is available at the bus or buses serving to supply electrical power at identified LPCI pumps 90, 91 and valves as at 120, 124, and 62, 64. Accordingly, as represented at line 212 and position 214, a decision or determination is made as to the presence of power at the LPCI injection pumps 90, 91. Simultaneously, as represented at line 216 and position 218, a determination is made that power is available at LPCI injection valves 120 and 124. Additionally, as represented by line 220 and position 222, a decision or determination is made as to whether power is now available at the discharge valves 62 and 64 of respective recirculation loops 56 and 57.

An additional condition is imposed with respect to the requirements represented at position 218 for powering LPCI injection valves 120 and 124. As represented at lines 224, 226 and position 228 the pressure exhibited at reactor 80 must fall lower than a predetermined lower pressure P1. That pressure may, for example, be in the range of 300 psi to 400 psi. In this regard, injection valves 120 and 124 are permitted to operate only on the occasion of a certain pressure differential across them.

Another permissive condition within the logic disclosed at block and bracket 202 is represented at position 230 wherein a decision or determination is made as to whether the reactor pressure is less than a predesignated value P2. This value, P2, is less than pressure value, P1, being, for example about 200 psi. Where that condition is met, then the logic continues as represented at line 232.

The logic diagram then continues to the region represented by block and bracket 234 providing for pump and valve actuation. It may be further noted that the logic diagram may be categorized vertically. For example, block and bracket 236 represent a region concerning the starting of the LPCI pumps 90, 91, while block and bracket 238 represent the vertical region of the diagram concerned with the opening of injection valves 120, 124, and block and bracket 240 are concerned with the closing of the discharge valves 62, 64, of respective recirculation loops 56 and 57. Note accordingly, that upon the decision or determination of the presence of power at pumps 90 and 91 as represented at position 214, then as shown by line 242 and position 246, the LPCI pumps 90, 91 are ready for rated flow. This means that the pump operation is up to rated speed and is now delivering at rated capacity in terms of flow. The conditions of control require that a full flow condition be satisfied before the assumption is made that the LPCI system is available for the LOCA condition.

Now looking to the presence of power at the LPCI injection valves 120 and 124, and the meeting of the pressure permissive condition as represented at position 228, with the conjoint occurrence of these conditions as represented by ANDing lines 248 and 250, the logic flow continues as represented at line 252 and position 254 to identify the condition that the LPCI injection valves 120 and 124 are open. Similarly, it is also necessary that the discharge valves 62, 64 be closed as represented at position 256 within vertical region 240. This discharge valve closure for recirculation loops 58 and 60 is made with the postulation that a break in the recirculation loops will be on the suction side of those recirculation pumps. Thus, the injection of the LPCI system is directed at the discharge side of pumps 58, 60 as well as corresponding discharge valves 62, 64.

Finally, it is necessary that the conditions represented by diagram positions 246, 254, and 256 occur conjointly.

This requirement is represented by ANDing lines 258, 260, and 262.

Since certain changes may be made in the above system and method without departing from the scope of the invention herein involved, it is intended that all matter contained in the above description or shown in the accompanying drawings shall be interpreted as illustrative and not in a limiting sense.

We claim:

1. A low pressure coolant injection system for a nuclear power facility of a variety having a boiling water reactor having a reactor core with normal operating pressure, first and second recirculation loops including respective first and second recirculation pumps and actuable discharge valves, a suppression pool water source, a condensate storage tank, and a safety system responsive to a loss-of-coolant accident to generate a safety output, comprising:

first and second low pressure coolant injection pumps having suction inputs and discharge outputs and actuable to pump water;

supply conduit means for coupling said suction inputs of said first and second low pressure coolant injection pumps in fluid flow communication with said suppression pool;

first and second coolant injection conduits coupled with respective said discharge outputs of said first and second low pressure coolant injection pumps and to respective said first and second recirculation loops;

first and second hydraulic resistance means within respective said first and second coolant injection conduits for restricting the flow of water coolant therein to a predetermined fluid rate selected to deliver a predetermined quantity of water coolant to each said first and second recirculation loops, said flow rate being selected as effective for carrying out the emergency cooling of said reactor core from one said coolant injection conduit; and control means responsive to said safety output for actuating said first and second low pressure coolant injection pumps.

2. The low pressure coolant injection system of claim 1 including:

first and second low pressure coolant injection valves within respective said first and second coolant injection conduits and actuable between closed and open orientations; and said control means is responsive to said safety output for simultaneously actuating said first and second low pressure coolant injection valves to said open orientation.

3. The low pressure coolant injection system of claim 2 in which said control means is responsive to actuate said low pressure coolant injection valves only in the presence of a predetermined pressure, P1, exhibited by said boiling water reactor of value less than said normal operating pressure.

4. A low pressure coolant injection system for a nuclear power facility of a variety having a boiling water reactor having a reactor core with normal operating pressure, first and second recirculation loops including respective first and second recirculation pumps and actuable discharge valves, a suppression pool water source, a condensate storage tank, and a safety system responsive to a loss-of-coolant accident to generate a safety output, comprising:

first and second low pressure coolant injection pumps having suction inputs and discharge outputs and actuable to pump water;

supply conduit means for coupling said suction inputs of said first and second low pressure coolant injection pumps in fluid flow communication with said suppression pool;

first and second coolant injection conduits coupled with respective said discharge outputs of said first and second low pressure coolant injection pumps and to respective said first and second recirculation loops;

first and second orifices within respective said first and second coolant injection conduits, said first and second orifices being selectively configured for restricting the flow of water coolant within said first and second coolant injection conduits to a predetermined fluid rate selected to deliver a predetermined quantity of water coolant to each said first and second recirculation loops, said flow rate being selected as effective for carrying out the emergency cooling of said reactor core from one said coolant injection conduit; and control means responsive to said safety output for actuating said first and second low pressure coolant injection pumps.

5. A low pressure coolant injection system for a nuclear power facility of a variety having a boiling water reactor having a reactor core with normal operating pressure, first and second recirculation loops including respective first and second recirculation pumps and actuable discharge valves, a suppression pool water source, a condensate storage tank, and a safety system responsive to a loss-of-coolant accident to generate a safety output, comprising:

first and second low pressure coolant injection pumps having suction inputs and discharge outputs and actuable to pump water;

supply conduit means for coupling said suction inputs of said first and second low pressure coolant injection pumps in fluid flow communication with said suppression pool;

first and second coolant injection conduits coupled with respective said discharge outputs of said first and second low pressure coolant injection pumps and to respective said first and second recirculation loops between said reactor and said discharge valves;

first and second hydraulic resistance means within respective said first and second coolant injection conduits for restricting the flow of water coolant therein to a predetermined fluid rate selected to deliver a predetermined quantity of water coolant to each said first and second recirculation loops, said flow rate being selected as effective for carrying out the emergency cooling of said reactor core from one said coolant injection conduit; and control means responsive to said safety output for actuating said first and second low pressure coolant injection pumps and said discharge valves of said first and second recirculation loops to a closed condition.

6. The low pressure coolant injection system of claim 5 in which said control means is responsive to actuate said discharge valves of said first and second recirculation loops to said closed condition only in the presence of a predetermined pressure, P2, exhibited by said boiling water reactor of value less than said normal operating pressure.

7. The low pressure coolant injection system of claim 6 including:
   first and second low pressure coolant injection valves within respective said first and second coolant injection conduits and actuable between closed and open orientations; and
   said control means is responsive to said safety output for simultaneously actuating said first and second low pressure coolant injection valves.

8. The low pressure coolant injection system of claim 7 in which said control means is responsive to actuate said low pressure coolant injection valves only in the presence of a predetermined pressure, P1, exhibited by said boiling water reactor of value less than said normal operating pressure, said predetermined pressure, P1, being greater than said predetermined pressure, P2.

9. The low pressure coolant injection system of claim 1 in which:
   said supply conduit means includes cross tie conduit means for selectively interconnecting said discharge outputs of said first and second low pressure coolant injection pumps;
   including cross tie valve means within said cross tie conduit means actuable between open and closed conditions for selectively directing the outputs of said first and second low pressure coolant injection pumps to one said first and second recirculation loop through select said first and second coolant injection conduits; and
   said control means retains said cross tie valve means in said open condition in the presence of said safety output.

10. The low pressure coolant injection system of claim 1 in which said supply conduit means effects coupling of said suction inputs of said first and second low pressure coolant injection pumps with said condensate storage tank.

11. The method for injecting low pressure cooling water into the boiling water reactor of a nuclear power facility having a source of emergency core cooling water, first and second independent recirculation loops normally circulating water through the core of said reactor for steam generation and a safety system responsive to a loss-of-coolant accident to generate a safety output for effecting the supply of at least a predetermined quantity of water coolant to said reactor, comprising the steps of:
   providing first and second water flow paths from said source of water coolant to respective said first and second recirculation loops;
   providing low pressure coolant injection pumps actuable for pumping water from said source through said first and second water flow paths;
   providing valve means actuable from a closed to an open condition for effecting flow within said first and second water flow paths;
   actuating said valve means in response to said safety output to permit water coolant flow simultaneously in each said first and second water flow paths;
   actuating said low pressure coolant injection pumps in response to said safety output; and
   restricting the flow of said water coolant in each said first and second water flow path to a predetermined fluid rate selected to deliver said predetermined quantity of water coolant to each said respective first and second independent recirculation loops, said flow rate being selected as effective for carrying out the emergency cooling of said reactor core from one said water flow path.

12. The method of claim 11 in which said step restricting the flow of said water coolant in each said first and second water flow path is carried out by applying a select hydraulic resistance thereto.

13. The method of claim 11 in which said step restricting the flow of said water coolant in each said first and second water flow path is carried out by providing a selectively configured orifice within each said first and second water flow path.

14. The method of claim 11 in which said step restricting the flow of said water coolant in each said first and second water flow path is carried out simultaneously for each said path.

15. The method of claim 11 in which said step of providing a low pressure injection cooling pump includes the steps of:
   providing a first low pressure coolant injection pump within a first safety division having a first input for pumping water from said source through said first water flow path;
   providing a second low pressure coolant injection pump within a second safety division having a second output for pumping water from said source through said second water flow path; and
   commonly coupling said first and second outputs of respective said first and second low pressure coolant injector pumps.

16. The method of claim 15 including the steps of:
   providing a cross tie valve between said first and second outputs of respective said first and second low pressure coolant injector pumps; and
   opening said cross tie valve in response to said safety output.

17. The method of claim 11 in which:
   said first and second recirculation loops include respective first and second recirculation pumps having an input side in fluid transfer communication with said reactor from a location beneath said core and having a discharge side in fluid transfer communication with said reactor at a location above said reactor core and each said first and second recirculation loop further includes a discharge valve located at said discharge side of each said first and second recirculation pump; and
   including the step of closing each said discharge valve in response to said safety output.

18. A low pressure coolant injection system for a nuclear power facility of a variety having a boiling water reactor having a reactor core and normal operating pressure, first and second recirculation loops including respective first and second recirculation pumps and actuable discharge valves, a suppression pool water source, a condensate storage tank, and a safety system responsive to a loss-of-coolant accident to generate a safety output, comprising:
   first and second low pressure coolant injection pumps having suction inputs and discharge outputs and actuable to pump water;
   supply conduit means for coupling said suction inputs of said first and second low pressure coolant injection pumps in fluid flow communication with said suppression pool and including:

cross tie conduit means for selectively interconnecting said discharge outputs of said first and second low pressure coolant injection pumps;

first and second coolant injection conduits coupled with respective said discharge outputs of said first and second low pressure coolant injection pumps and to respective said first and second recirculation loops;

first and second low pressure conduit injection valves within respective said first and second coolant injection conduits and actuable between closed and open orientations;

first and second hydraulic resistance means within respective said first and second coolant injection conduits for restricting the flow of water coolant therein to a predetermined fluid rate selected to deliver a predetermined quantity of water coolant to each said first and second recirculation loops, said flow rate being selected as effective for carrying out the emergency cooling of said reactor core from one said coolant injection conduit;

cross tie valve means within said cross tie conduit means, actuable between open and closed conditions for selectively directing the outputs of said first and second low pressure coolant injection pumps to one said first and second recirculation loop through select said first and second coolant injection conduits; and control means responsive to said safety output for actuating said first and second low pressure coolant injection pumps and said first and second low pressure coolant injection valves to said open orientation, and for retaining said cross tie valve means in said open condition in the presence of said safety output.

19. The low pressure coolant injection system of claim 18 in which said supply conduit means effects coupling of sais suction inputs of said first and second low pressure coolant injection pumps with said condensate storage tank.

20. A low pressure coolant injection system for a nuclear power facility of a variety having a boiling water reactor having a reactor core and normal operating pressure, first and second recirculation loops including respective first and second recirculation pumps and actuable discharge valves, a suppression pool water source, a condensate storage tank, and a safety system responsive to a loss-of-coolant accident to generate a safety output, comprising:

first and second low pressure coolant injection pumps having suction inputs and discharge outputs and actuable to pump water;

supply conduit means for coupling said suction inputs of said first and second low pressure coolant injection pumps in fluid flow communication with said suppression pool and including:

cross tie conduit means for selectively interconnecting said discharge outputs of said first and second low pressure coolant injection pumps;

first and second coolant injection conduits coupled with respective said discharge outputs of said first and second low pressure coolant injection pumps and to respective said first and second recirculation loops;

first and second low pressure conduit injection valves within respective said first and second coolant injection conduits and actuable between closed and open orientation;

first and second orifices within respective said first and second coolant injection conduits selectively configured for restricting the flow of water coolant therein to a predetermined fluid rate selected to deliver a predetermined quantity of water coolant to each said first and second recirculation loops, said flow rate being selected as effective for carrying out the emergency cooling of said reactor core from one said coolant injection conduit;

cross tie valve means within said cross tie conduit means, actuable between open and closed conditions for selectively directing the outputs of said first and second low pressure coolant injection pumps to one said first and second recirculation loop through select said first and second coolant injection conduits; and control means responsive to said safety output for actuating said first and second low pressure coolant injection pumps, said first and second low pressure coolant injection valves and retaining said cross tie valve means in said open condition in the presence of said safety output.

* * * * *